United States Patent
Napier et al.

(10) Patent No.: US 7,703,090 B2
(45) Date of Patent: Apr. 20, 2010

(54) PATCH UN-INSTALLATION

(75) Inventors: Carolyn L. Napier, Seattle, WA (US); Christopher S. Gouge, Redmond, WA (US); David E. Kays, Bellevue, WA (US); Rahul Thombre, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 10/930,461

(22) Filed: Aug. 31, 2004

(65) Prior Publication Data

US 2006/0048129 A1  Mar. 2, 2006

(51) Int. Cl.
G06F 9/44 (2006.01)
G06F 15/177 (2006.01)
G06F 13/00 (2006.01)
G11C 29/00 (2006.01)

(52) U.S. Cl. ........................ 717/168; 709/221; 711/133; 714/764

(58) Field of Classification Search ........................ None
See application file for complete search history.

(56) References Cited

U.S. PATENT DOCUMENTS

| | | | |
|---|---|---|---|
| 5,649,200 A | 7/1997 | Leblang et al. | |
| 6,161,218 A | 12/2000 | Taylor | |
| 6,317,880 B1 | 11/2001 | Chamberlain et al. | |
| 6,367,075 B1* | 4/2002 | Kruger et al. | 717/169 |
| 6,381,742 B2 | 4/2002 | Forbes et al. | |
| 6,427,236 B1 | 7/2002 | Chamberlain et al. | |
| 6,434,744 B1* | 8/2002 | Chamberlain et al. | 717/168 |
| 6,438,749 B1 | 8/2002 | Chamberlain | |
| 6,477,703 B1* | 11/2002 | Smith et al. | 717/168 |
| 6,493,871 B1 | 12/2002 | McGuire et al. | |
| 6,496,974 B1 | 12/2002 | Sliger et al. | |
| 6,584,583 B2* | 6/2003 | Nam | 714/42 |
| 6,668,289 B2* | 12/2003 | Cheng et al. | 710/36 |
| 6,859,923 B2* | 2/2005 | Taylor | 717/172 |
| 7,073,172 B2* | 7/2006 | Chamberlain | 717/169 |
| 7,185,332 B1 | 2/2007 | Waldin et al. | |
| 7,313,792 B2* | 12/2007 | Buban et al. | 717/170 |
| 2002/0100017 A1* | 7/2002 | Grier et al. | 717/120 |
| 2002/0100036 A1* | 7/2002 | Moshir et al. | 717/173 |
| 2002/0144248 A1 | 10/2002 | Forbes et al. | |
| 2002/0152229 A1* | 10/2002 | Peng | 707/203 |
| 2002/0174422 A1* | 11/2002 | Kelley et al. | 717/178 |
| 2003/0056102 A1 | 3/2003 | Aho et al. | |

(Continued)

OTHER PUBLICATIONS

Removing patches [retrieved on Dec. 10, 2009]. Retrieved from the Internet: <URL: http://msdn.microsoft.com/en-us/library/aa371212(VS.85).aspx>.*

(Continued)

Primary Examiner—Tuan Q Dam
Assistant Examiner—Hanh T Bui
(74) Attorney, Agent, or Firm—Senniger Powers LLP (57) ABSTRACT

Uninstalling a patch applied to a software product installed on a computer. A current state of a software product is identified. A desired state of the software product is determined. The desired state of the software product represents a state of the software product when a patch applied to the software product is removed from the software product. The patch is removed from the software product to transition the software product from the identified current state to the determined desired state.

37 Claims, 5 Drawing Sheets

U.S. PATENT DOCUMENTS

| | | | |
|---|---|---|---|
| 2003/0145317 A1* | 7/2003 | Chamberlain | 717/177 |
| 2003/0220944 A1 | 11/2003 | Lyman Schottland et al. | |
| 2003/0220992 A1* | 11/2003 | DiRico | 709/221 |
| 2004/0003266 A1* | 1/2004 | Moshir et al. | 713/191 |
| 2004/0003390 A1 | 1/2004 | Canter et al. | |
| 2004/0015938 A1* | 1/2004 | Taylor | 717/168 |
| 2004/0015942 A1* | 1/2004 | Branson et al. | 717/168 |
| 2004/0088694 A1 | 5/2004 | Ho | |
| 2004/0181790 A1* | 9/2004 | Herrick | 717/168 |
| 2004/0210653 A1 | 10/2004 | Kanoor et al. | |
| 2005/0050538 A1 | 3/2005 | Kawamata et al. | |
| 2005/0155031 A1* | 7/2005 | Wang et al. | 717/170 |
| 2005/0257214 A1* | 11/2005 | Moshir et al. | 717/171 |
| 2006/0020938 A1 | 1/2006 | Elcock et al. | |
| 2007/0079279 A1* | 4/2007 | Gordon et al. | 717/100 |

OTHER PUBLICATIONS

Uninstalling patches [retrieved on Dec. 10, 2009]. Retrieved from the Internet: <URL: http://msdn.microsoft.com/en-us/library/aa372104(VS.85).aspx>.*

Provos et al., "Improving Host Security with System Call Policies," CiteSeer, CITY-University of Michigan, 15 pages, Nov. 2002, USA.

Provos et al., "Preventing Privilege Escalation," CiteSeer, CITY-University of Michigan, 11 pages, Aug. 2002, USA.

Borup, Rick, "Understanding Windows Installer," Oct. 2003, 16 pages.

Unknown, "Windows Installer: Benefits and Implementation for System Administration," Nov. 1, 2001, 73 pages, available at http://www.microsoft.com/technet/prodtechnol/windows2000serv/maintain/featusability/w..., printed on Aug. 25, 2007.

* cited by examiner

PATCH UN-INSTALLATION

TECHNICAL FIELD

Embodiments of the present invention relate to the field of software updates. In particular, embodiments of the invention relate to uninstalling a patch applied to a software product.

BACKGROUND OF THE INVENTION

Application developers invest a lot of time in releasing a software product. However, trade-offs in the design cycle and unforeseen or undiscovered issues may cause a developer to release an update (e.g., a patch) to a software product. Unfortunately, a software update that the developer releases to resolve an issue may itself inadvertently cause a problem in the software product. Thus, the developer may ultimately desire to recall the software update to remove the update from a machine where it is applied. In the example of a corporate environment, the deployment of a software update may result in conflicts between different lines of business applications. Until a user addresses such conflicts, he or she may desire to uninstall the software update from corporate machines so that the business applications remain functional.

Presently, to uninstall a software update, a user (e.g., an administrator) would typically uninstall the software product completely. The user then reinstalls the software product and reapplies software updates excluding the update that caused an issue in the product. However, given the volume of updates that a developer may release for a software product, it may be difficult for the user to undergo this tedious process. For example, if a software product installed on a machine includes 19 applied patches, and the 20th patch causes the product to function improperly, a user would have to uninstall the software product, reinstall the original version of the software product, and then reapply the 19 patches to the software product. This process may cause the user to incur significant costs and time to uninstall a single patch.

Another existing approach to uninstall a patch is for an update author to create a corresponding undo patch that has the reverse effect of the patch being installed. However, since this patch merely reverses the changes made by the original patch, changes to the same resources by other patches applied to the software product are ignored. Accordingly, applying the undo patch often results in an incorrect or undesirable product state.

In another existing approach, an installation engine stores the original state of the resources modified by the patch when the patch is being installed. When uninstalling the patch, the installation engine merely restores these resources back to the previously stored state. Since this simply restores the resources to a state before the original application of the patch being uninstalled, other updates to those resources by subsequent patches are ignored. Accordingly, uninstalling a patch in this manner may also result in an incorrect or undesirable product state.

Accordingly, a solution that effectively uninstalls a patch applied to a software product without unduly compromising the desired product state is desired.

SUMMARY OF THE INVENTION

Embodiments of the invention overcome one or more deficiencies in the prior art by providing, among other things, effective un-installation of a patch applied to a software product. Embodiments of the invention allow a patch author to enable the removal of a software update after applying the update to a machine. Removable software patches provide users the ability to uninstall a problematic software update that has caused functionality degradation in a machine and to effectively restore the machine to a proper product state. According to an embodiment of the invention, an installation engine uses data included within a patch as well as data representative of a current machine state to determine an appropriate action upon uninstalling the patch from the machine. The installation engine also calculates resources affected by the patch and restores these resources to their prior states (i.e., the states before the patch was applied to the machine). The installation engine also considers other patches that have been applied to the machine such that modifications generated by these other patches still remain in the machine when the installation engine uninstalls the patch. In addition, the installation engine does not restrict transactions to a singe patch un-installation. The installation engine may uninstall multiple patches for the same software product at the same time (e.g., when these multiple patches were bundled together when applied to the machine) and may uninstall a patch while installing another patch to the machine. Moreover, the installation engine may uninstall patches in any order or sequence without negative side effects and with a correct behavior.

According to another embodiment of the invention, a local memory area such as a cache in a user's machine provides further efficiency to patch un-installation. This cache allows synthesis of files without accessing the original software installation media (e.g., a Compact Disc (CD), the Internet, etc.). Accordingly, an installation engine may uninstall a patch by restoring the files stored in the cache and using the data of the remaining patches to update those files to the desired product state.

Briefly described, a method employing aspects of the invention uninstalls a patch applied to a software product installed on a computer. The method includes identifying a current state of a software product. The method also includes determining a desired state of the software product. The desired state of the software product represents a state of the software product when a patch applied to the software product is removed from the software product. The method further includes removing the patch from the software product to transition the software product from the identified current state to the determined desired state.

In another embodiment of the invention, a system employing aspects of the invention uninstalls a patch applied to a software product. The system includes a memory area for storing data identifying a current state of a software product. The system also includes a processor configured to receive the stored data identifying the current state of the software product from the memory area and to determine a desired state of the software product. The desired state of the software product represents a state of the software product when a patch applied to the software product is removed from the software product. The processor is further configured to remove the patch from the software product to transition the software product from the identified current state to the determined desired state.

In yet another embodiment of the invention, computer-readable media have computer-executable components for uninstalling a patch applied to a software product. The computer-readable media include a memory component for storing data regarding a current state of a software product. The computer-readable media also include a resource state evaluator component for determining a desired state of the software product. The desired state of the software product represents a state of the software product when a patch applied to the software product is removed from the software product. The computer-readable media further include a removal evaluator component for identifying the patch applied to the software product for removal. The computer-readable media also include a patching component for removing the patch from the software product to transition the software product from the current state to the determined desired state.

In yet another embodiment of the invention, computer-readable media have stored thereon a data structure for uninstalling a patch applied to a software product. The data structure includes a property field for storing data identifying a metadata property of a patch. The metadata property controls an un-installation behavior of the patch. The data structure also includes a value field for storing data specifying a value of the metadata property identified by the data stored in the property field.

Computer-readable media having computer-executable instructions for performing a method of uninstalling a patch applied to a software product embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS AND TABLES

TABLE 1 provides exemplary logics for un-installation privileges.

TABLE 2 provides an exemplary database schema for declaring metadata of a patch.

TABLE 3 provides an exemplary format of a PatchFileList table according to one embodiment of the invention.

Corresponding reference characters indicate corresponding parts throughout the drawings.

DETAILED DESCRIPTION OF THE INVENTION

Figure 1:
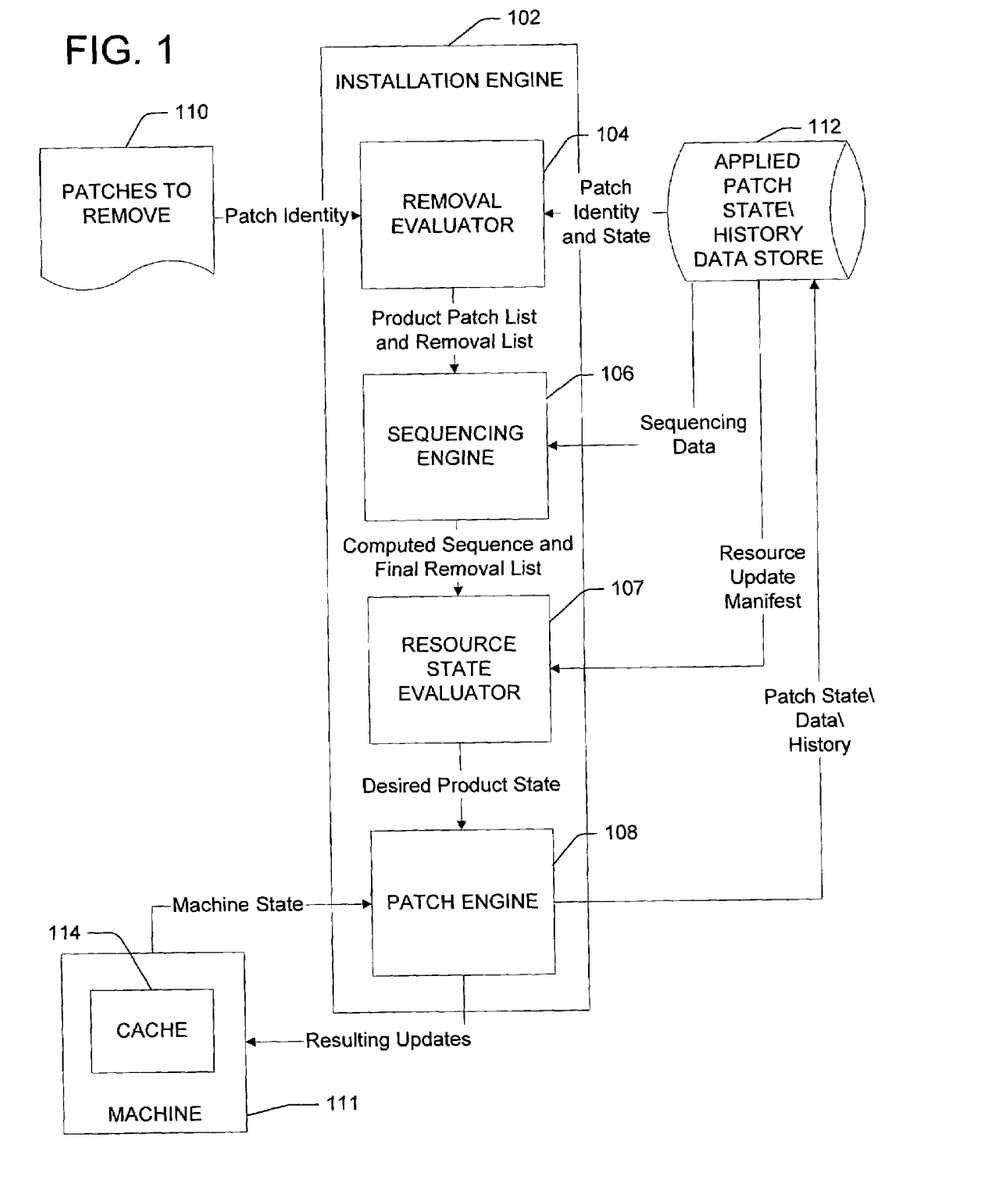
FIG. 1 is a block diagram illustrating an exemplary environment in which embodiments of the present invention may be utilized.

FIG. 1 illustrates an exemplary environment in which embodiments of the invention may be utilized. As shown in FIG. 1, a processor such as an installation engine 102 includes a removal evaluator 104, a sequencing engine 106, a resource state evaluator 107, and a patch engine 108. In FIG. 1, a user provides the identities of patches 110 to the installation engine 102 to invoke installation engine 102 to remove the set of patches 110 from a machine 111 (e.g., a computer). The set of patches 110 represents one or more updates to a software product already installed and/or executed on the machine 111. The set of patches 110 may also include one or more updates that have not yet been installed on machine 111. In such a case, the removal evaluator 104 of installation engine 102 reports such updates that have not yet been installed as unknown. As illustrated, removal evaluator 104 of installation engine 102 receives the identities of the set of patches 110. Removal evaluator 104 also receives the identities and states of a list of patches currently installed on machine 111 from a memory area such as an applied patch state\history data store 112. By receiving the identities of the set of patches 110 to be removed and the identifies and states of the list of installed patches, removal evaluator 104 may determine if a user may remove one or more of the set of patches 110 from machine 111. Removal evaluator 104 then withdraws those patches that are removable from consideration by the sequencing engine 106 of installation engine 102.

Sequencing engine 106 receives a product patch list specifying the list of patches currently installed on machine 111 and a removal list specifying the removal patches from removal evaluator 104. Based on the received list of installed patches, the received removal list, and sequencing data supplied by the applied patch state\history data store 112, sequencing engine 106 computes a final list of applicable patches (and their logical order of applications, which unlike the chronological order of applications, defines a patch sequence irrespective of the time at which a patch is applied to machine 111) and a final removal list specifying the patches to be uninstalled from machine 111. The final removal list may include additional dependent patches not previously included in the set of patches 110. Sequencing engine 106 then provides the final list of applicable patches and the final removal list to the resource state evaluator 107 of installation engine 102.

Resource state evaluator 107 receives resource update manifests from applied patch state\history data store 112 and processes the resource update manifests for each patch in the final removal list to determine what resources are to be restored in machine 111 upon removing the patch from machine 111. Resource state evaluator 107 then determines a desired product state of machine 111 by analyzing the modifications other patches have made to the resources to be restored. Accordingly, resource state evaluator 107 allows the resources to remain at a patched state if some other patches have updated the resources. Resource state evaluator 107 then provides the determined desired product state to the patch engine 108 of installation engine 102.

In addition to receiving the determined desired product state, patch engine 108 also receives a current state of machine 111. Therefore, patch engine 108 may determine a way to uninstall a patch based on the desired product state and the current machine state. For example, if the current state of machine 111 is the same as the desired product state, patch engine 108 may decide not to update the resources on machine 111 during the un-installation of patches included in the final removal list supplied by sequencing engine 106. Patch engine 108 may also update one or more resources such that machine 111 achieves the desired product state.

According to one embodiment of the invention, patch engine 108 uninstalls a patch from machine 111 by utilizing a reinstall process. Specifically, when uninstalling a patch, patch engine reinstalls those resources that are affected by the patch to be uninstalled. Patch engine 108 performs an optimization such that it does not reinstall other resources that are not affected by the patch to be uninstalled. Patch engine 108 further restores the resources affected by the uninstalled patch to a resultant version expected by the product with the uninstalled patch excluded. After patch engine 108 uninstalls the patch, it un-registers the patch from the product in applied patch state\history data store 112 and reports the result of the un-installation operation. Patch engine 108 may then restore and re-register any patch that was rendered unnecessary by the uninstalled patch for which its data still exists. Some exemplary resources that patch engine 108 may remove/unregister from machine 111 or add/register to machine 111 in response to uninstalling a patch include, but are not limited to, files, registry keys and values, shortcuts, and directories.

After patch engine 108 determines an action for machine 111 and, for example, uninstalling a patch from machine 111, it determines a new current state of machine 111 and stores this new current state in applied patch state\history data store 112 as a new patch state\history of machine 111. Applied patch state\history data store 112 may then supply this new patch state\history to removal evaluator 104, sequencing engine 106, and/or resource state evaluator 107 during the next round of patch un-installations.

Also shown in FIG. 1, machine 111 includes a local memory area such as a cache 114. Patch engine 108 creates and updates the cache 114 when applying a patch to machine 111 and accesses cache 114 when uninstalling a patch from machine 111. For example, when installation engine 102 applies a patch to the machine, it may save certain versions of the affected files in cache 114. Cache 114 may be organized in several ways. For example, cache 114 may be organized using user, product, and product version boundaries. Cache 114 may be organized using user boundaries to isolate per-machine data from per-user data. Organizing cache 114 using product boundaries enables installation engine 102 to find cache files easily. Organizing cache 114 using product version boundaries enables easier caching of data for patch un-installation.

Files stored in cache 114 use unique identifiers as their file names such that these files are uniquely named in cache 114. This eliminates the use of a database that includes file mapping between expected file names and randomly generated names. It is also desirable that the file identifiers remain constant throughout the life of the software product such that installation engine 102 may rely on the file identifiers when performing patch un-installation.

According to one embodiment of the invention, cache 114 is a copy-on-write cache with respect to original files of a software product. Thus, cache 114 may store those files that a delta compression patch or full-file patch has updated. This reduces the proliferation of files stored in cache 114. Since patch engine 108 will restore those files that are affected by a patch to be uninstalled, files to be stored in cache 114 may be limited to those files that are affected by the patch.

In an alternative embodiment of the invention, cache 114 maintains copies of baseline files included in baseline patches. Baseline patches represent patches that modify the targetable state of a software product. Cache 114 stores baseline files for future use based on temporal locality logic. That is, installation engine 102 may perform pro-active caching when it predicts that a file included in a baseline patch has a high likelihood of being updated in the future. Therefore, baseline caching further reduces the proliferation of files stored in cache 114. Baseline caching further allows cache 114 to maintain proper copies of shared files even if these shared files are stored within the same directory and have been updated by some other patches. It is noted cache 114 may perform baseline caching in conjunction with copy-on-write caching for original files of a software product. It may be desirable that cache 114 stores at least the original files of a software product to allow installation engine to use these files as a starting point for achieving the desired state as computed by resource state evaluator 107. However, cache 114 may achieve disk optimization by caching baseline files and full-file patches to exclude the original files from cache 114.

When installation engine 102 installs a software product on machine 111 or applies a patch to machine 111, it generates un-installation data for storage on cache 114. Since a patch may be a delta compression update or a full-file update, installation engine 102 is configured to handle both cases when generating un-installation data. If the applied patch is a first delta compression update or a full-file update for a file, then installation engine 102 stores the current version of the file in cache 114 (e.g., when the file is an original file for a software product). On the other hand, if the applied patch is a baseline patch, installation engine 102 may store a generated file in cache 114 since the baseline patch represents a checkpoint version. Furthermore, since a patch may obsolete or supersede another patch (i.e., the patch renders the other patch unnecessary because it includes the changes or updates made by the other patch), installation engine 102 may desire to restore the obsoleted or superseded patch when it uninstalls the obsoleting or superseding patch. Accordingly, cache 114 may maintain files from the obsoleted or superseded patch until installation engine 102 explicitly uninstalls the obsoleted or superseded patch in applied patch state\history data store 112. In an embodiment of the invention, if patch application is unsuccessful, installation engine 102 may not store corresponding files in cache 114. Thus, if installation engine 102 fails to apply a patch to machine 111 and the installation transaction is rolled back, installation engine 102 may remove the recently stored files corresponding to this patch from cache 114.

Write and read privileges for cache 114 may be limited for certain users. This prevents unauthorized users from placing improper data during patch un-installation and prevents such users from accessing sensitive data included in cache 114. This also protects the data stored in cache 114 from deletion by unauthorized users. An embodiment of the invention marks directories within cache 114 as hidden such that it is difficult for users to see or access the directories and accidentally delete data within the directories. Additionally, an embodiment of the invention may mark data stored in cache 114 as read-only to prevent users or other users from accidentally deleting the stored data.

Cache 114 is generally available for the lifetime of a software product. However, certain parts of cache 114 may be removed for various reasons. For example, if a user has limited disk space on machine 111, he or she may use a disk cleanup utility to remove data stored in cache 114 that the user has a privilege to access. The user may still access the removed data from the source media (e.g., a CD, the Internet, etc.) after the cleanup utility cleans cache 114. Installation engine 102 may further manage cache 114 in several ways. For instance, installation engine 102 may completely delete data for a given product from cache 114 when it completely uninstalls the product. Installation engine 102 may further instruct cache 114 to limit storage of data to the original files of a given product and, for example, one or more most recent product baselines. In addition, when uninstalling a baseline patch, installation engine 102 may remove the baseline patch's cached data if the baseline patch is the last patch in a sequence of patches. Installation engine 102 may also manage cache 114 by limiting the total size of cached files to a certain maximum, specified by either an absolute size or as a percentage of available resources on the machine 111.

The environment illustrated in FIG. 1 may implement logics as to who may uninstall a patch from machine 111. TABLE 1 provides exemplary logics for un-installation privileges.

TABLE 1

Exemplary Logics for Un-installation Privileges

| User | Per-Machine | Per-User Non-Managed (this user) | Per-User Non-Managed (other user) | Per-User Managed (this user) | Per-User Managed (other user) |
|---|---|---|---|---|---|
| Administrator | Allow | Allow | Disallow | Allow | Disallow |
| Non-Administrator | Disallow | Allow | Disallow | Disallow | Disallow |

According to an embodiment of the invention, an administrator may uninstall a patch whether the product context is per-user (i.e., the product is installed for a particular user) or per-machine (i.e., the product is installed for different users on a machine). In another embodiment of the invention, a non-administrator may uninstall a patch of a product that was installed per-user and not managed by an administrator. Thus, a non-administrator may uninstall a patch of a product that was originally installed by that non-administrator.

There may be situations where an administrator desires to override the default behavior of installation engine 102 with respect to un-installation privileges. For example, the administrator may want to have a global setting that prevents users from removing patches without having to modify each patch individually. The administrator may override the default behavior by creating a policy regarding patch un-installation. Such a policy, referred to herein as a DisablePatchUninstall policy, prevents a user from uninstalling a patch from machine 111. An administrator may set the DisablePatchUninstall policy to maintain a software product at its patched version, regardless of its product context (e.g., per-machine or per-user).

Figure 2:
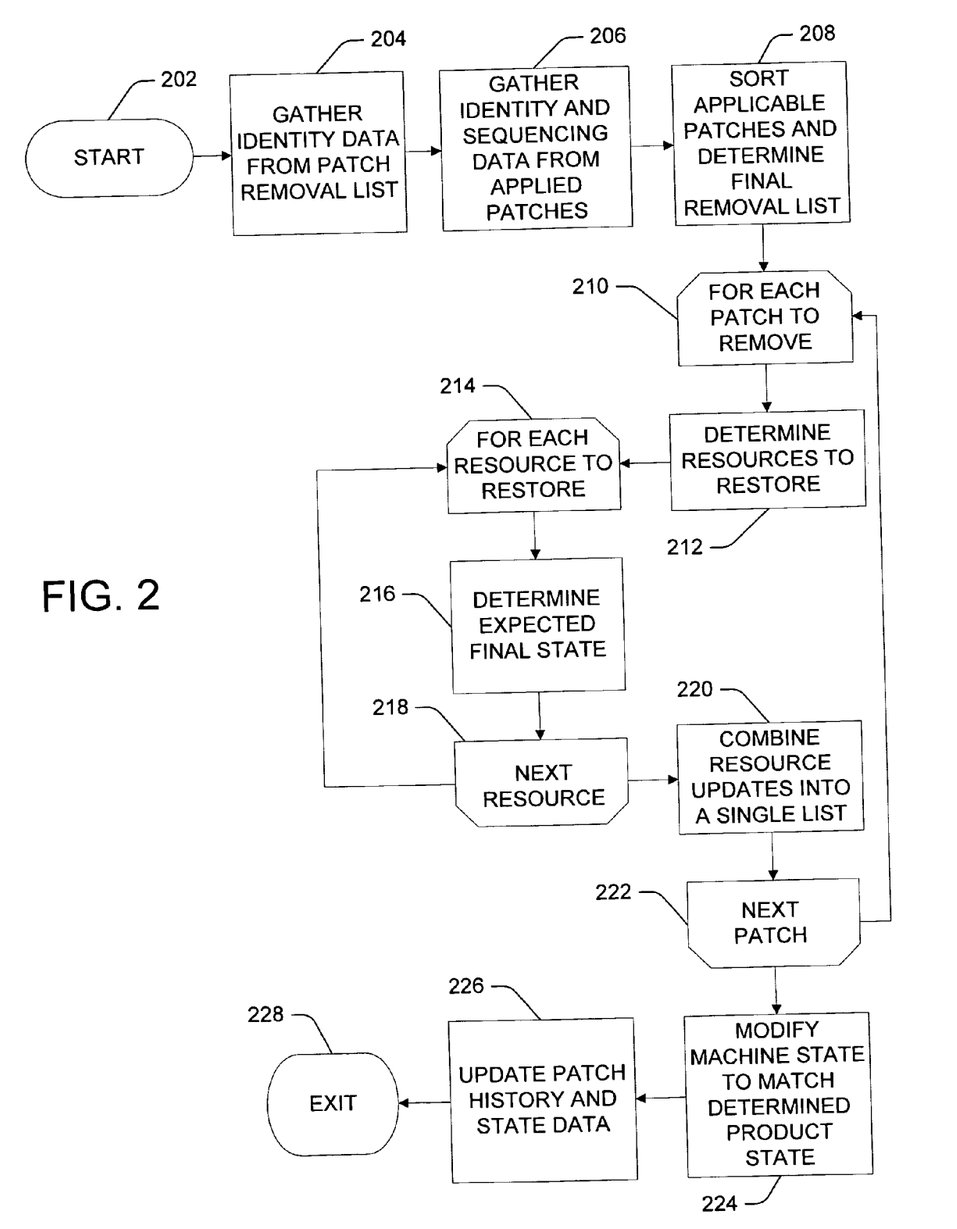
FIG. 2 is an exemplary flow diagram illustrating process flow according to one embodiment of the invention for uninstalling a patch applied to a software product.

FIG. 2 illustrates an exemplary process flow that installation engine 102 utilizes to uninstall a patch applied to a software product according to one embodiment of the invention. At 202, the process starts. At 204, identity data regarding one or more patches to be removed is gathered. At 206, identity data and sequencing data regarding a list of applicable patches currently installed on the machine are gathered. At 208, the list of applicable patches may be sorted based on stated relationships between updates in the list of patches, and a final removal list specifying the patches to be uninstalled is determined.

To determine the final removal list specifying the patches to be uninstalled, removal evaluator 104 decides if any patch of the initial list of patches to be removed is not removable. Installation engine 102 may further generate an error message for an attempt to uninstall a non-removable patch. In addition, if a non-removable patch depends on any other patches applied to the software product, those other patches are also deemed non-removable. Therefore, removal evaluator 104 also excludes such patches from the final removal list. There are several ways in which installation engine 102 may determine if a patch is a non-removable patch. For example, a patch author may designate a patch as non-removable. In another example, some patches may make system changes that are not undoable. Examples of such patches include modifications to a database schema and critical security fixes.

Similarly, an administrator may globally disallow the un-installation of patches on the machine by setting the DisablePatchUninstall policy.

In another embodiment of the invention, removal evaluator 104 does not include in the final removal list those patches that are no longer individually identifiable. For example, a software product may be installed from a source that has the various changes made by one or more patches incorporated into the software product. More specifically, the software product may be installed from an image where the patches were applied in such a way as to no longer be individually identifiable. Therefore, installation engine 102 may not determine which patch to remove, and removal evaluator may exclude such patches from the final removal list.

Since application of a patch during dynamic setup does not provide a concrete division between changes made by the software installation and changes made by the patch application, undoing the transaction means a complete un-installation of the software product itself. Accordingly, a dynamic setup patch may not be un-installable.

In an alternative embodiment of the invention, a patch author may explicitly declare if a patch is un-installable and a scope of the patch un-installation. TABLE 2 provides an exemplary database schema for the patch author to declare explicit un-installation information for a given patch.

TABLE 2

Exemplary Database Schema for Declaring Metadata of a Patch

| Column Name | Nullable? | Key? | Type | Description |
|---|---|---|---|---|
| Scope | Yes | Yes | Identifier | Defines the scope of the patch's metadata property. |
| Property | No | Yes | Identifier | Identifies the patch's metadata property. |
| Value | No | No | Text | Value of the patch's metadata property. |

The identifier provided in the Scope column defines a scope of a declared metadata property. For example, if the Scope column identifies a specific software product, then the metadata property of the patch applies to this specific software product. If the Scope column is null, then the metadata property of the patch applies to the various software products installed and/or executed on the user's machine. The identifier provided in the Property column specifies a metadata property of the patch. For example, the Property column may specify an AllowRemoval property to control the un-installation behavior of the patch. In this example, if the corresponding Value column stores a value of 1, then the patch is removable.

At 208, sequencing engine 106 further sorts the list of applicable patches. Specifically, sequencing engine 106 determines which patches become applicable, obsoleted, and/or superseded as a result of uninstalling the patches included in the final removal list. Accordingly, some patches that have previously been obsoleted or superseded may become applicable again. Sequencing engine 106 then determines a logical order for patches that are applicable to the machine (excluding the patches to be uninstalled).

At 210, for each patch included in the final removal list, resources to be restored as a result of the un-installation are determined at 212. According to an embodiment of the invention, resource state evaluator 107 will generate a file list specifying patched resources that are to be restored to their previous un-patched versions upon uninstalling the patch. Resource state evaluator 107 analyzes a given set of the patch's resource update manifests to determine what resources were updated by the patch and, therefore, are to be restored to their previous states. For example, resource state evaluator 107 may analyze the resource update manifests to search file update instructions. For each file instruction found, resource state evaluator 107 then adds the file to the file list.

One embodiment of the invention uses a temporary PatchFileList table to process patch un-installation information. The PatchFileList table lists each file that has been updated by the patch. TABLE 3 provides an exemplary format of the PatchFileList.

TABLE 3

Exemplary Format of the PatchFileList Table

| Column Name | Nullable? | Key? | Type | Description |
|---|---|---|---|---|
| File | No | Yes | Identifier | File table key for the file updated by this patch. |
| State | Yes | No | Short | State assigned to the file (e.g., remove, install, force overwrite, etc.). |
| FileName | Yes | No | Filename | Actual file name of the file. Set when the file is to be removed. |
| Directory | Yes | No | Identifier | Identifier of a directory of the file. Set when the file is to be removed. |

Resource state evaluator 107 may further query other resource tables such as registry keys, registry values, and extensions to determine which resources have been modified by the patch. If the patch added new contents (e.g., registry keys and values, extensions, files, verbs, etc.) to the software product when installed, resource state evaluator 107 determines which contents were added by the patch. When installation engine 102 uninstalls the patch, it removes any content that was added by the patch to the software product from the product's registration if the content is no longer referenced in the product's resultant configuration after un-installation.

At 214 of FIG. 2, for each resource that resource state evaluator 107 has determined to restore, an expected final state of the resource is determined at 216. For example, if the patch adds a resource that is not in the product's resultant configuration, the final state of the resource is to exclude the resource from the product. On the other hand, if the patch upgrades a version of the resource, the product's resultant configuration may indicate that the final state of the resource is its previous version. At 218, it is determined if there is another resource that will be restored by installation engine 102 when uninstalling the patch. If there is another resource, the process returns to 214. If there is not another resource to consider, the resource updates are combined into a single list at 220 for installation engine 102 to perform the restoration.

At 222, it is determined if there is another patch in the final removal list. If there is another patch, the process returns to 210. If there is not another patch in the final removal list, the machine's state is modified to match a determined product state at 224. Specifically, installation engine 102 will restore the affected resources to their proper states such that any changes made by the patches to be uninstalled are undone. For example, files affected by these patches are restored to their previous versions or are removed from the machine, registry settings are rewritten, and shortcuts are updated. Patch engine 108 of installation engine 102 performs product reinstallation to uninstall the patches in the final removal list. Patch engine 108 overwrites those files that have been updated by these patches with the expected version of the files based upon the product's resultant configuration (including the remaining patches not to be uninstalled). The reinstallation overwrites these files regardless of their versions. In an embodiment of the invention, patch engine 108 may perform a limited reinstallation such that patch engine 108 does not reinstall resources other than those affected by the patches to be uninstalled. This limited reinstallation improves the speed of the un-installation process and minimizes the occasions for original software source media access. After uninstalling the patches in the final removal list, patch engine 108 un-registers these patches from the machine and removes them from applied patch history\state data store 112.

At 226, new patch history and machine state data resulting from uninstalling the patches are stored, for example, at applied patch state\history data store 112. This new patch history and machine state data may later be fetched to removal evaluator 104, sequencing engine 106, and/or resource state evaluator 107 for future patch un-installations. At 228, the process then exits.

APPENDIX A provides different scenarios on patch un-installation according to embodiments of the invention.

Figure 3:
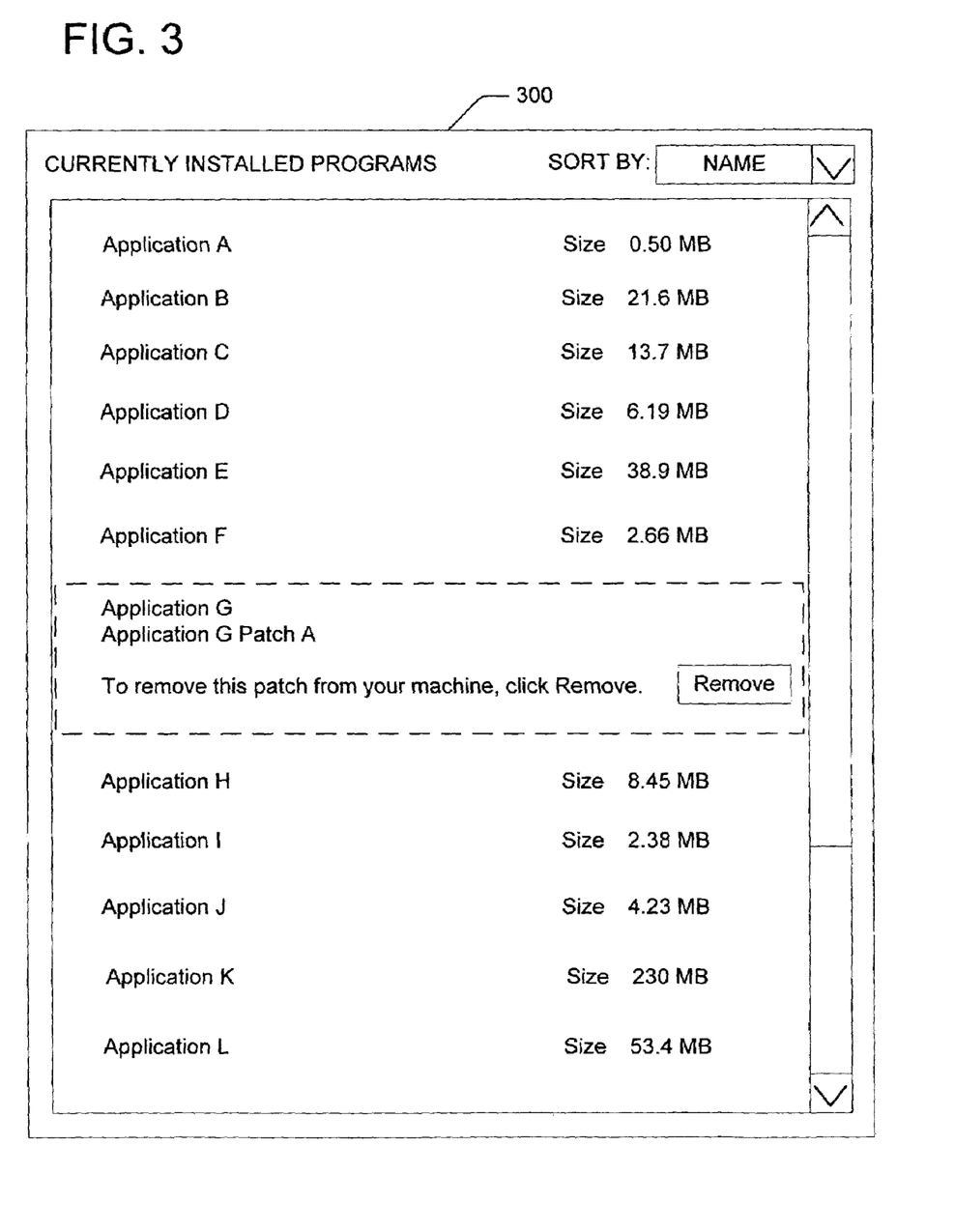
FIG. 3 is a block diagram illustrating an exemplary format of a user interface (UI) for a user to uninstall a patch according to one embodiment of the invention.

Referring to FIG. 3, illustrated is an exemplary format of a user interface (UI) 300 for a user to uninstall a patch applied to his or her machine. However, patch un-installation may also be performed without using a user interface. In this case, an installation engine is configured to automatically perform the patch un-installation without user input.

The UI 300 may be operative using machine context mode or user context mode. In the machine context mode, UI 300 displays products and corresponding patches installed on the machine for the user to perform patch un-installation. In the user context mode, UI 300 displays products and corresponding patches installed specifically for a particular user for the user to perform patch un-installation.

According to one embodiment of the invention, UI 300 display a list of patches installed for a given software product and permits the user to remove the patches in an arbitrary removal order. UI 300 displays different software products installed on the machine and sorts these software products by alphabetical order. Following each displayed software product, UI 300 displays a list of patches that have been applied to the software product. UI 300 identifies each displayed patch using a product name of the corresponding software product followed by the patch's identifier. The user may select one or more patches displayed in UI 300. Upon selecting the one or more patches, UI 300 renders a "remove" button to the user. The user may then select the "remove" button to initiate un-installation of the patches.

In an alternative embodiment of the invention, UI 300 may display the last chronologically applied patch of a given software product for the user to uninstall. In this alternative embodiment of the invention, the user may uninstall other patches applied before the last chronologically applied patch via a command line operation or an application programming interface (API).

The first time installation engine 102 applies a patch to a software product, installation engine 102 creates an entry in UI 300 for the patch. For each subsequent patch applied to the product, installation engine 102 updates UI 300 to include the patch. Alternatively, installation engine 102 may update the entry in UI 300 to reference the most recent patch. After installation engine 102 uninstalls a patch, it updates the entry in UI 300 to reference the next most recent patch. For example, if installation engine 102 applies Patch A to a software product on the machine and subsequently applies Patch B to the same software product, the current entry in UI 300 displays Patch B for the user to perform the un-installation.

When installation engine 102 subsequently uninstalls Patch B, the entry in UI 300 displays Patch A for the user to perform the un-installation. When installation engine 102 subsequently uninstalls Patch A, installation engine 102 removes the entry in UI 300 because no patch is available for un-installation. Installation engine 102 may also remove the entry in UI 300 after it uninstalls the software product.

In an alternative embodiment of the invention, for each software product installed on a machine, an un-installation application is registered for the product in the machine to display eligible patches for that product. The user may then activate the un-installation application to select one or more of these eligible patches to perform patch un-installation. The un-installation application may further provide additional information such as a description of each eligible patch. The un-installation application may also display patches beyond the most recent baseline of the software product to allow the user to rollback to the product's previous baseline.

Figure 4:
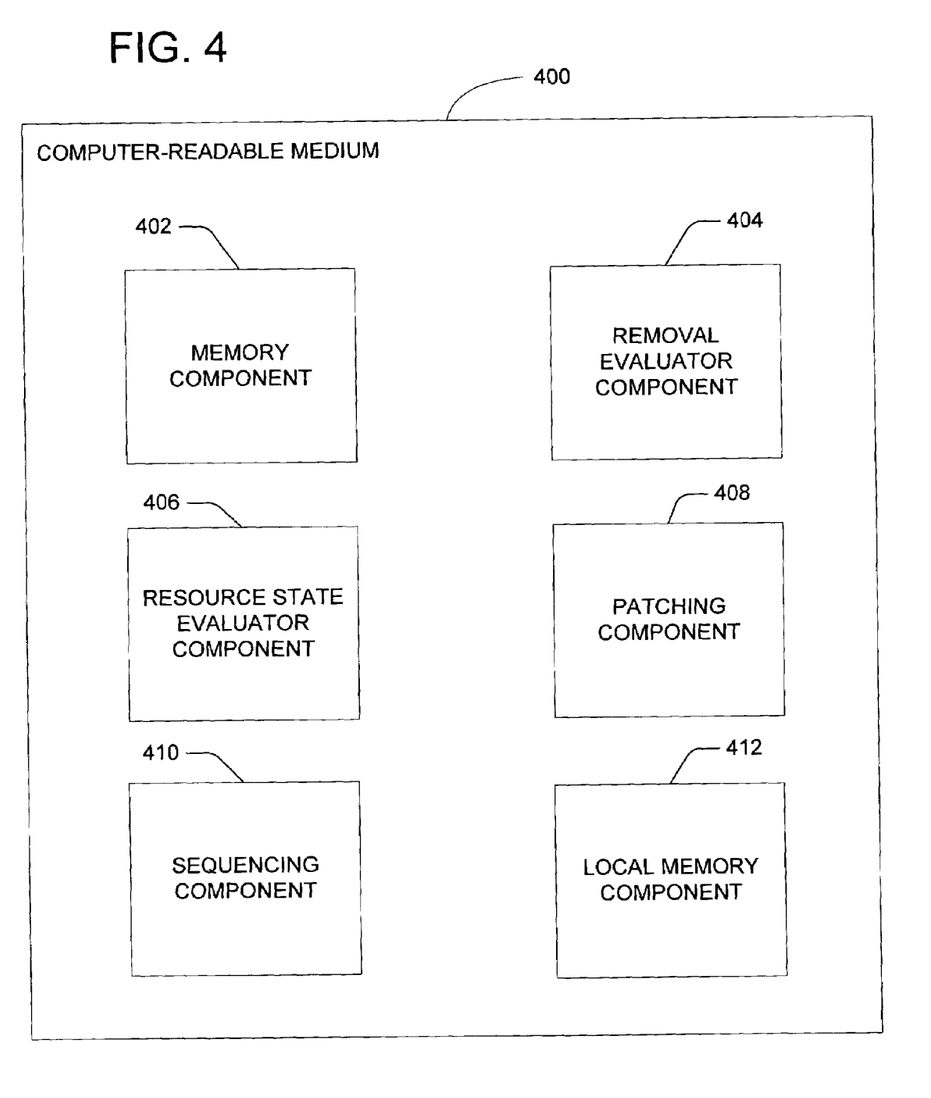
FIG. 4 is a block diagram illustrating another exemplary computer-readable medium according to one embodiment of the invention.

FIG. 4 is a block diagram illustrating an exemplary computer-readable medium 400 according to one embodiment of the invention. As shown, the computer-readable medium 400 includes a memory component 402, a removal evaluator component 404, a resource state evaluator component 406, a patching component 408, a sequencing component 410, and a local memory component 412. However, it is contemplated that computer-readable medium 400 may be any quantity of computer readable media and may comprise various combinations of components and functionalities associated with each component.

The memory component 402 stores data regarding a current state of a software product (e.g., the stored data may identify a list of applicable patches currently applied to the software product). The removal evaluator component 404 receives from a user data regarding a patch applied to the software product. The resource state evaluator component 406 determines a desired state of the software product representative of a state when the patch is removed from the software product. The patching component 408 removes the patch from the software product to transition the software product from the current state to the determined desired state.

Removal evaluator component 404 is configured to determine if the patch is removable in response to receiving the data regarding the patch from the user. If removal evaluator component 404 determines the patch to be removable, the sequencing component 410 determines a logical order of application for the list of applicable patches excluding the patch to be removed. Patching component 408 then automatically reapplies the list of applicable patches excluding the patch to be removed to the software product in accordance with the determined logical order of application. Patching component 408 further removes the removable patch from the software product. In response to removing the removable patch from the software product, patching component 408 also restores a patch that has been superseded or obsoleted by the removed patch to the software product. Moreover, patching component 408 is configured to determine a new state of the software product in response to removing the patch from the software product. And memory component 402 is configured to store the determined new state of the software product.

Resource state evaluator component 406 is configured to determine a desired state of a resource of the software product that has been affected by the patch. Patching component 408 then modifies the resource to the determined desired state of the resource in response to removing the patch from the software product. For example, if the patch added the resource to the software product when the patch was applied to the software product, patching component 408 is configured to remove the resource from the software product. Patching component 408 may also modify the resource of the software product by restoring affected files, registry keys and values, directories, shortcuts, and other resources to their previous states.

The local memory component 412 (e.g., a cache) is configured to store the resource of the software product when the patch was applied such that patching component 408 may directly access the resource from local memory component 412. Local memory component 412 may also store data identifying a baseline version of the software product when the patch was applied such that resource state evaluator component 406 may use memory component 402 to determine the desired state of the software product. Patch engine 408 may access local memory component 412 to synthesize this desired state.

Figure 5:
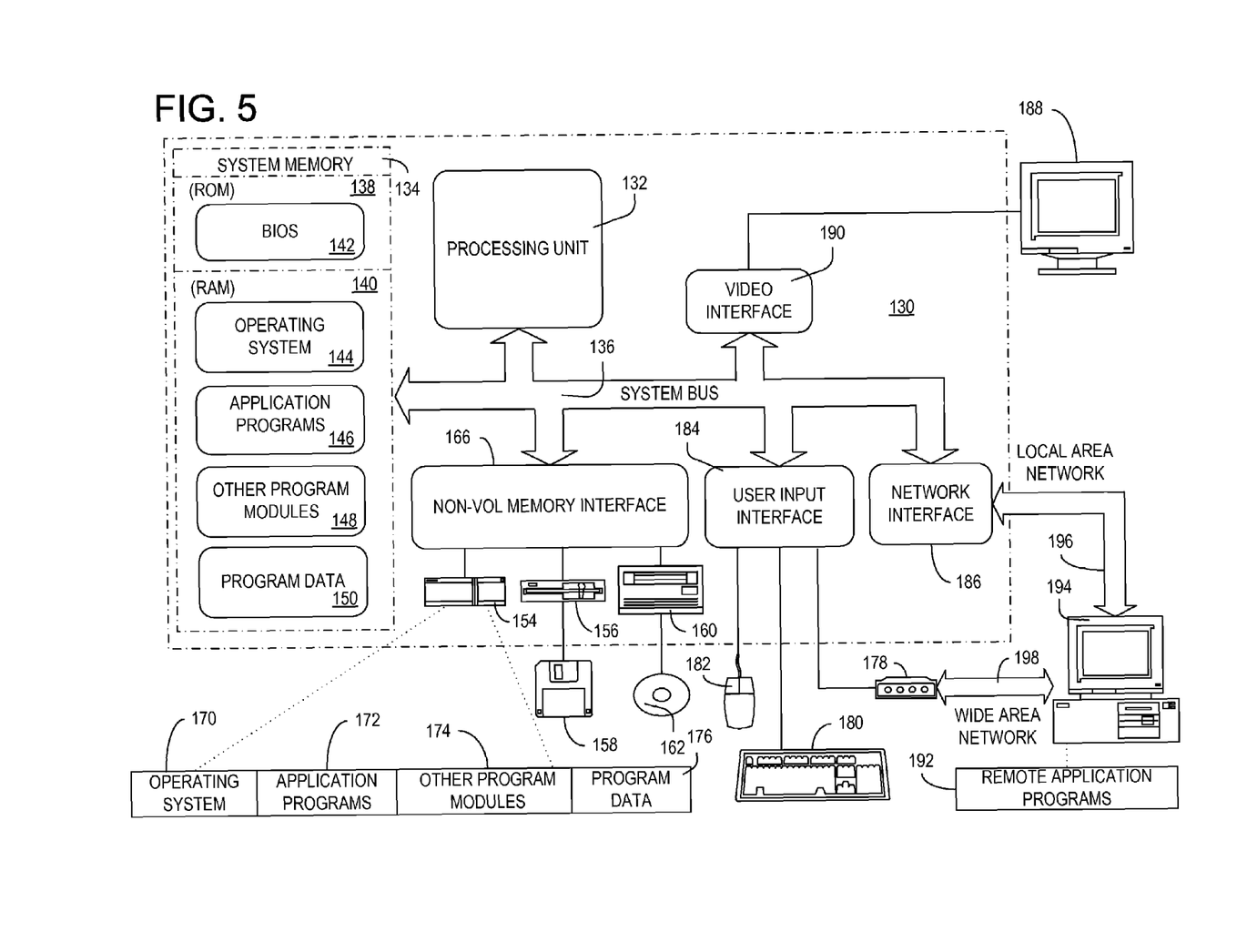
FIG. 5 is a block diagram illustrating an exemplary embodiment of a suitable computing system environment in which one embodiment of the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 196 or WAN 198 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to uninstall a patch applied to a software product installed on a computer. Computer-executable instructions are configured to identify a current state of a software product. Computer-executable instructions are also configured to determine a desired state of the software product. The desired state of the software product represents a state of the software product when a patch applied to the software product is removed from the software product. Computer-executable instructions are further configured to remove the patch from the software product to transition the software product from the identified current state to the determined desired state.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX A

APPENDIX A provides different scenarios on patch un-installation according to embodiments of the invention.

Single Last Product Patch Un-Installation

In the single patch un-installation scenario, a single target product exists. Patches are built from a single code base. The last chronological patch applied patch to the product is eligible for un-installation. For example, Company A releases Application A. Within a few weeks, Company A provides Patch A and Patch B for Application A. When Patch A becomes available, an administrator deploys the patch to his or her users. When Patch B becomes available, the administrator similarly deploys the patch to his or her users. The administrator then receives reports from his or her users that their line of business application no longer functions properly. Figuring that this is due to the Patch B, the administrator decides to remove Patch B from his or her deployment and uninstalls the patch from the users' machines.

Intermediate Patch Un-Installation

The intermediate patch un-installation scenario describes a situation where an existing patch that is not the last chronological applied patch is being uninstalled. For example, Company A releases Application A. Within a few weeks, Company A provides Patch A to add some new templates to Application A. Later, Company A provides Patch B to add additional templates to Application A. User A purchases Application A and installs it to his or her machine. After exercising the existing templates, User A downloads and installs Patch A. Some time later, User A downloads and installs Patch B. Later, User A decides to remove Patch A from the machine and thus uninstalls Patch A. This puts the software product in a configuration identical to if User A had not installed Patch A.

Simple Patch with Shared Component Un-Installation

The simple patch with shared component un-installation scenario concerns the expected behavior when the un-installation of a patch affects a component shared with another product. The result may be a situation where two different patches applied to two different products that update the same file. For example, Company A releases Shared Component A. An independent software vendor (ISV) develops a game application called Game A that includes Shared Component A. The same ISV also produces another game called Game B, which also includes Shared Component A. Therefore, both games consume Shared Component A. After releasing the games, Company A releases an updated version of Shared Component A that fixes some bugs in the implementation. At the time, the ISV is considering updates for both of its games so it decides to consume the updated Shared Component A for distribution in its updates. Patch A is shipped with the updated Shared Component A and some bug fixes for the Game A. Patch B is also shipped with the updated Shared Component A and includes a new content scene for Game B. User A installs both Game A and Game B on his or her machine. When updates to the games become available, User A installs them. Unfortunately, Game B begins to crash whenever User A reaches some stage in any scene. User A's game did not crash before he or she applied Patch B so he or she decides to uninstall Patch B and wait for a future update from the ISV. Given that both Game A and Game B install the updated Shared Component A to the same location, the un-installation of Patch B may take into consideration the requested file version of the Shared Component A files by the Patch A. In an alternative embodiment of the invention, the un-installation of Patch B may decide to enforce the desired state for Game B and may result in a removal of the update to Shared Component A.

Multiple Target Products Patch Un-Installation

The multiple target products patch un-installation refers to the scenario where a single patch applies to multiple target products. For example, Company A ships an update for Application A. Instead of creating a separate patch for each product stock-keeping unit (SKU), Company A releases a single patch that targets multiple possible product SKUs. In situations where two stand-alone installed product SKUs share a common component, the patch applies to both stand-alone product SKUs. For example, SKU A and SKU B of Application A may be installed as stand-alone products, and Company A may release Patch A for a shared component of SKU A and SKU B. Patch A accordingly is a patch that targets multiple products. If Patch A causes a problem in both product SKUs, then a user may wish to uninstall Patch A. Un-installation of Patch A removes the applicable updates from both product SKUs.

Patch Un-Installation with Obsolescence

The patch un-installation with obsolescence scenario describes a situation where a patch that obsoleted a previous patch is uninstalled. The un-installation of the obsoleting patch brings back the obsoleted patch. For example, Company A ships Application A. Company A later delivers Patches A, B, and C to address some issues. Later, Company A releases Baseline Patch M for Application A. Baseline Patch M obsoletes Patches A, B, and C because it includes those fixes. Baseline Patch M also includes additional fixes for Application A. User A deploys Application A to machines in his or her organization. User A also installs Patches A, B, and C to the machines. When Baseline Patch M becomes available, User A deploys Baseline Patch M to the machines in the organization. Unfortunately, the additional fixes included in Baseline Patch M break some existing templates used by the organization. Accordingly, User A uninstalls Baseline Patch M until the templates may be updated. The un-installation of Baseline Patch M brings back Patches A, B, and C that Baseline Patch M obsoleted, and the machine remains up-to-date with those patches.

Patch Un-Installation with Multiple Target File Versions

The patch un-installation with multiple target file versions describes a situation where a single patch may be applied to multiple versions of a product. If a subsequent patch updates the same file as a previous patch, then the desired state of the file is computed based on the effects of patches that are still applied to the product. For example, a single patch updates versions 0 and 1 of File A in the same product. If the version of File A before application of the patch is 0, then the un-installation of the patch returns File A to version 0.

Multiple Patch Un-Installations

Multiple patch un-installations refer to scenarios in which two or more patches are selected for un-installation at the same time. This is an extension to single patch un-installation capabilities.

Patches that May not be Uninstalled

Some patches may not be uninstalled. This situation may exist because application of the patch made changes that are not reversible. For example, changes to a database schema may not be reversible. In essence, the patch becomes permanent for the lifetime of the product. A patch author may also designate a patch as non-removable. Moreover, patches may be non-removable if a software product depends on such patches.

What is claimed is:

1. A method of uninstalling a patch applied to a software product installed on a computer, the method comprising:
    identifying a current state of a software product;
    applying a patch to the software product, said patch being specific to the software product;
    determining a desired state of the software product, the desired state of the software product representing a state of the software product when the patch is removed from the software product with the software product remaining installed on the computer;
    removing the applied patch from the software product; and
    transitioning the software product from the identified current state to the determined desired state,
    said removing comprises at least one of the following:
        determining a desired state of a resource of the software product that has been affected by the applied patch, and
        modifying the resource to the determined desired state of the resource, said modifying the resource of the software product comprises accessing the resource from a cache of the computer to modify the resource of the software product, said cache being created and updated by the patch when the patch is applied to the computer, wherein the resource is stored in the cache when the patch was applied to the software product, wherein said cache is a copy-on-write cache with respect to original files of the software product and stores files limited to those that are affected by the patch such that the stored files can be restored from the cache during removal of the applied patch.

2. The method of claim 1 further comprising determining if the patch is removable, and wherein removing the patch from the software product comprises removing the patch from the software product if the patch is determined to be removable.

3. The method of claim 1 wherein identifying the current state of the software product comprises identifying a list of applicable patches currently applied to the software product.

4. The method of claim 3 wherein removing the patch from the software product comprises:
    determining a logical order of application for the applicable patches in the list excluding the patch to be removed, and
    automatically reapplying the applicable patches in the list excluding the patch to be removed to the software product in accordance with the determined logical order of application.

5. The method of claim 1 wherein modifying the resource of the software product to the determined desired state of the resource comprises removing the resource from the software product if the patch added the resource to the software product when the patch was applied to the software product.

6. The method of claim 1 wherein modifying the resource of the software product to the determined desired state of the resource comprises restoring one or more of the following to their previous states: a file, a registry key, a registry value, a directory, and a shortcut.

7. The method of claim 1 wherein determining the desired state of the software product comprises identifying a baseline version of the software product based on data stored in a local memory area of the computer, the data being representative of one or more patches previously applied to the software product and the data being stored in the local memory area when the one or more patches were applied to the software product.

8. The method of claim 7, wherein modifying comprises accessing the resource from the cache of the computer, said cache storing copies of baseline files included in baseline patches for the baseline version of the software product.

9. The method of claim 1 wherein removing the patch from the software product comprises restoring one or more of the following to the software product: a patch that has been superseded by the patch to be removed and a patch that has been obsoleted by the patch to be removed.

10. The method of claim 1 further comprising:
    determining a new state of the software product in response to removing the patch from the software product, and
    storing the determined new state of the software product in a memory area.

11. The method of claim 1 further comprising determining if a user is allowed to remove the patch from the software product.

12. The method of claim 11 further comprising allowing a user to manage the removal of the patch from the software product via a user interface.

13. The method of claim 1 wherein one or more computer storage media have computer-executable instructions for performing the method recited in claim 1.

14. The method of claim 1, further comprising using one or more computer storage media having stored thereon a data structure for uninstalling a patch applied to a software product, the data structure comprising:
- a property field for storing data identifying a metadata property of the patch, the metadata property controlling an un-installation behavior of the patch, and
- a value field for storing data specifying a value of the metadata property identified by the data stored in the property field.

15. The method of claim 14 wherein the data structure further comprises a scope field for storing data defining a scope of the metadata property.

16. The method of claim 15 wherein the data stored in the scope field identifies a software product for which the un-installation behavior of the patch is applicable.

17. The method of claim 14 wherein the data stored in the value field specifies if the patch is removable, and wherein a processor is configured to remove the patch from a software product if the data stored in the value field specifies that the patch is removable.

18. The method of claim 1, wherein the cache is organized based on at least one of the following way: based on user boundaries to isolate per-machine data from per-user data, product boundaries for enabling the installation engine to easily locate the resources in the cache, and product version boundaries for enabling easy caching of data for the patch removal.

19. A system for uninstalling a patch applied to a software product, the system comprising:
- a memory area for storing data identifying a current state of a software product;
- a processor configured to receive the stored data identifying the current state of the software product from the memory area, said processor further applying a patch to the software product, said patch being specific to the software product, said processor determining a desired state of the software product, said desired state of the software product representing a state of the software product when the patch is removed from the software product with the software product remaining installed on the computer, the processor further being configured to remove the applied patch from the software product to transition the software product from the identified current state to the determined desired state, wherein the processor is configured to:
- determine a desired state of a resource of the software product that has been affected by the applied patch, and
- modify the resource to the determined desired state of the resource in response to removing the patch from the software product; and
- a local memory area including a cache, and wherein the processor is configured to access the resource from the local memory area to modify the resource of the software product, the resource being stored in the local memory area when the patch was applied to the software product, said cache being created and updated by the patch when the patch is applied to the computer, wherein the resource is stored in the cache when the patch was applied to the software product, wherein said cache is a copy-on-write cache with respect to original files of the software product and stores files limited to those that are affected by the patch such that the stored files can be restored from the cache during removal of the applied patch.

20. The system of claim 19 wherein the processor is configured to determine if the patch is removable, and wherein the processor is configured to remove the patch from the software product if the patch is determined to be removable.

21. The system of claim 20 wherein the memory area is configured to store data regarding a list of applicable patches currently applied to the software product.

22. The system of claim 21 wherein the processor is configured to:
- receive the data regarding the list of applicable patches from the memory area,
- determine a logical order of application for the applicable patches in the list excluding the patch to be removed, and
- automatically reapply the applicable patches in the list excluding the patch to be removed to the software product in accordance with the determined logical order of application.

23. The system of claim 19 wherein the processor is configured to remove the resource from the software product if the patch added the resource to the software product when the patch was applied to the software product.

24. The system of claim 19 further comprising a user interface for allowing a user to manage the removal of the patch from the software product.

25. The system of claim 19 further comprising a local memory area, and wherein the processor is configured to determine the desired state of the software product by identifying a baseline version of the software product based on data stored in the local memory area, the data being representative of one or more patches previously applied to the software product and the data being stored in the local memory area when the one or more patches were applied to the software product.

26. The system of claim 19 wherein the processor is configured to restore one or more of the following to the software product in response to removing the patch from the software product: a patch that has been superseded by the removed patch and a patch that has been obsolete by the removed patch.

27. The system of claim 19 wherein the processor is configured to determine a new state of the software product in response to removing the patch from the software product, and wherein the memory area is configured to store the determined new state of the software product.

28. The system of claim 19, wherein the cache is organized based on at least one of the following way: based on user boundaries to isolate per-machine data from per-user data, product boundaries for enabling the installation engine to easily locate the resources in the cache, and product version boundaries for enabling easy caching of data for the patch removal.

29. One or more computer storage media having computer-executable components for uninstalling a patch applied to a software product, the computer-readable media comprising:
- a memory component for storing data regarding a current state of a software product said software product having had a patched applied thereto, said patch being specific to the software product;
- a resource state evaluator component for determining a desired state of the software product, the desired state of the software product representing a state of the software product when the patch is removed from the software product with the software product remaining installed on the computer, wherein the resource state evaluator component is configured to determine a desired state of a resource of the software product that has been affected by the applied patch, and wherein the patching component is configured to modify the resource to the determined desired state of the resource in response to removing the applied patch from the software product;

a removal evaluator component for identifying the patch applied to the software product for removal;

a patching component for removing the applied patch from the software product to transition the software product from the current state to the determined desired state; and a local memory component for storing in a cache the resource of the software product when the patch was applied to the software product, and wherein the patching component is configured to modify the resource of the software product by accessing the resource from the local memory component to modify the resource of the software product, said cache being created and updated by the patch when the patch is applied to the computer, wherein the resource is stored in the cache when the patch was applied to the software product, wherein said cache is a copy-on-write cache with respect to original files of the software product and stores files limited to those that are affected by the patch such that the stored files can be restored from the cache during removal of the applied patch.

30. The computer storage media of claim 29 wherein the removal evaluator component is configured to determine if the patch is removable, and wherein the patching component is configured to remove the patch from the software product if the patch is determined to be removable.

31. The computer storage media of claim 29 wherein the memory component is configured to store data identifying a list of applicable patches currently applied to the software product.

32. The computer storage media of claim 31 further comprising a sequencing component for determining a logical order of application for the applicable patches in the list excluding the patch to be removed, and wherein the patching component is configured to automatically reapply the applicable patches in the list excluding the patch to be removed to the software product in accordance with the determined logical order of application.

33. The computer storage media of claim 29 wherein the patching component is configured to remove the resource from the software product if the patch added the resource to the software product when the patch was applied to the software product.

34. The computer storage media of claim 29 further comprising a local memory component for storing data identifying a baseline version of the software product when one or more patches were applied to the software product, and wherein the resource state evaluator component is configured to determine the desired state of the software product by accessing the local memory component to determine the baseline version of the software product.

35. The computer storage media of claim 29 wherein the patching component is configured to restore one or more of the following in response to removing the patch from the software product: a patch that has been superseded by the removed patch and a patch that has been obsolete by the removed patch.

36. The computer storage media of claim 29 wherein the patching component is configured to determine a new state of the software product in response to removing the patch from the software product, and wherein the memory component is configured to store the determined new state of the software product.

37. The one or more computer storage media of claim 29, wherein the cache is organized based on at least one of the following way: based on user boundaries to isolate per-machine data from per-user data, product boundaries for enabling the installation engine to easily locate the resources in the cache, and product version boundaries for enabling easy caching of data for the patch removal.

* * * * *

UNITED STATES PATENT AND TRADEMARK OFFICE
CERTIFICATE OF CORRECTION

| | | |
|---|---|---|
| PATENT NO. | : 7,703,090 B2 | Page 1 of 1 |
| APPLICATION NO. | : 10/930461 | |
| DATED | : April 20, 2010 | |
| INVENTOR(S) | : Carolyn L. Napier et al. | |

It is certified that error appears in the above-identified patent and that said Letters Patent is hereby corrected as shown below:

In column 20, line 53, in Claim 29, delete "product said" and insert -- product, said --, therefor.

Signed and Sealed this
Eighth Day of February, 2011

David J. Kappos
*Director of the United States Patent and Trademark Office*